G. H. SHELDON.
SPINNING SPINDLE.
APPLICATION FILED SEPT. 5, 1919.
1,338,102.
Patented Apr. 27, 1920.
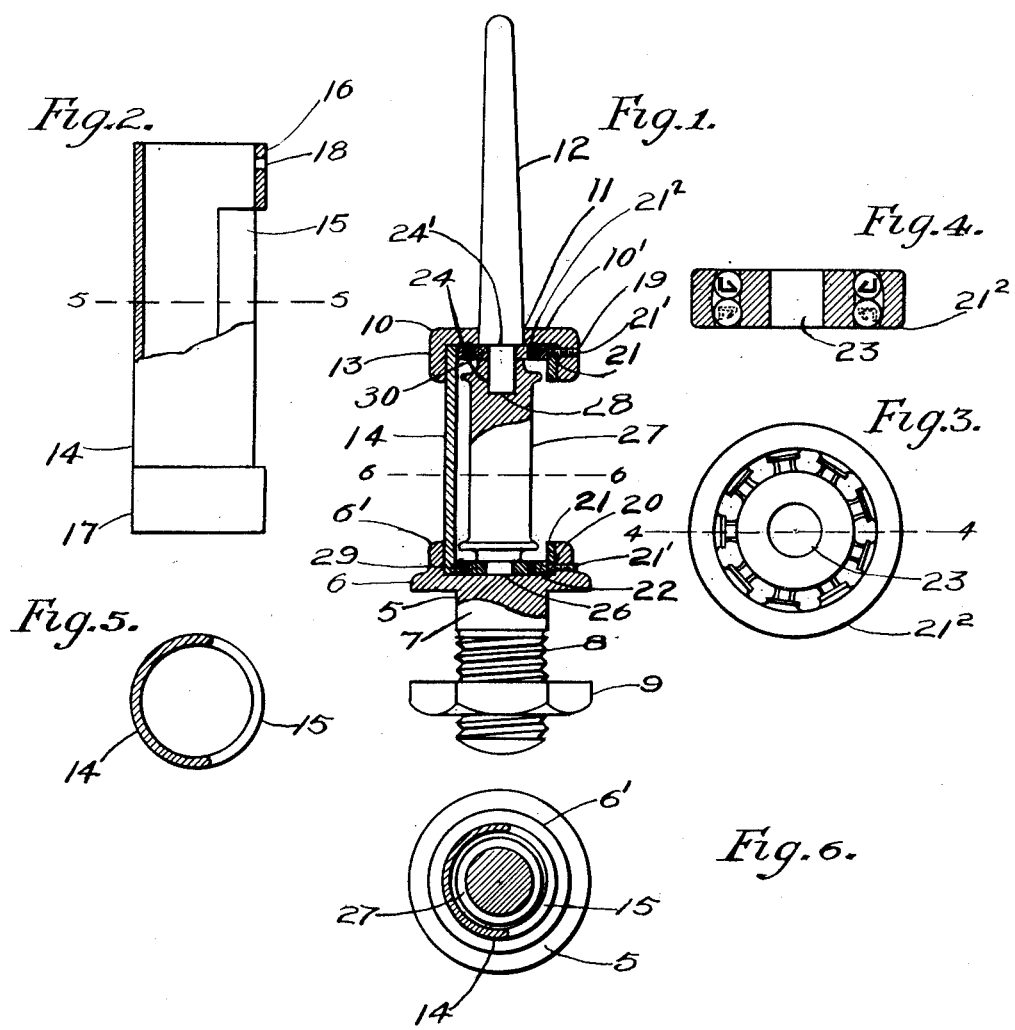
G. H. Sheldon
Inventor

UNITED STATES PATENT OFFICE.

GEORGE HOWARD SHELDON, OF WESTERLY, RHODE ISLAND.

SPINNING-SPINDLE.

1,338,102.　　　　Specification of Letters Patent.　　Patented Apr. 27, 1920.

Application filed September 5, 1919. Serial No. 321,994.

*To all whom it may concern:*

Be it known that I, GEORGE HOWARD SHELDON, a citizen of the United States, residing at Westerly, in the county of Washington and State of Rhode Island, have invented a new and useful Spinning-Spindle, of which the following is a specification.

This invention relates to new and useful improvements in spinning machines, and more particularly to the construction of the spindle and its support, employed in connection with such machines.

The primary object of the invention is to provide a spindle of this character which will operate freely under the tension of the thread used in connection therewith, the spindle being supported in suitable ball bearing races, to increase the speed thereof and reduce the friction between the various elements comprising the same.

A still further object of the invention is to provide a guard for the whirl, to guard against the ends of the thread becoming wrapped around the whirl in the event that the thread is broken during the operation of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 is a side elevational view of a spindle and whirl.

Fig. 2 is a side elevational view partly broken away of the guard.

Fig. 3 is a plan view of the ball bearing race.

Fig. 4 is a sectional view taken on line 4—4 of Fig. 3.

Fig. 5 is a sectional view taken on line 5—5 of Fig. 2.

Fig. 6 is a sectional view taken on line 6—6 of Fig. 1.

Having reference to the drawing in detail the reference character 5 designates the lower bearing support, which includes a circular head 6 having the upwardly extending annular flange 6' and the depending shaft 7, threaded as at 8, to receive the nut 9 for securing the bearing support to the frame of the spinning machine, on which the spindle is being used.

An upper bearing support 10 also includes a circular head 10' having a central aperture 11 to receive one end of the spindle 12, said head also having a depending annular flange 13 for purposes to be hereinafter more fully described.

The upper and lower bearing supports 5 and 10, are secured together, but held in spaced relation with each other by means of the guard 14, which as shown is substantially tubular and is provided with the cut out portion 15 forming the upper and lower collar members 16 and 17, each of which is provided with an opening 18 in registry with the threaded openings 19 and 20, formed in the annular flanges 6' and 13, whereby the reduced portions 21 of the set screws 21' may be positioned in the openings 18 of the collar members 16 and 17, thereby securely supporting the collar members with relation to the heads 5 and 10.

Positioned within the guard 14, and disposed adjacent each end thereof within the respective collar members 16 and 17, is a ball bearing race $21^2$, each of which is provided with a central opening 23, the opening in the upper ball bearing race $21^2$ adapted to receive the reduced end 24 of the substantially long spindle member 12, the lower ball race adapted to support the reduced end 26 of the whirl 27.

This whirl 27 is provided in its upper end with a squared opening 28 to receive the squared portion 24 of the reduced end $24^1$, of the spindle 12, whereby rotary movement of the whirl 27 is transmitted to the spindle 12. As shown, the whirl is held in spaced relation with the bearing races 21 and 22 by means of spacing rings 29 and 30, engaging between the ends of the whirl 27 and the respective ball bearing races $21^2$, it will thus be seen that the whirl has a free rotary movement, due to the ball bearing races which support the same.

From the foregoing, it is obvious that the whirl 27, which is rotated at high speed, by a belt connected thereto, said belt also having connections with a power device, not shown, is guarded by the guard 14, and in the event that the thread of the bobbin, not shown, becomes broken, it will be impossible for the end thereof to fall down and become tangled in the whirl 27.

Having thus described my invention, what I claim is:—

1. In the device of the kind described, spaced circular heads, a ball bearing race supported within each head, a substantially tubular guard member having its ends disposed within the circular heads, for holding the heads in spaced relation with each other, a whirl supported within the guard member, and means for connecting a spindle to the whirl whereby movement of the whirl produces a relative movement of the spindle.

2. In a device of the kind described, spaced heads having annular flanges, a substantially tubular guard member having its ends positioned within the annular flanges of the heads, ball bearing races supported within the ends of the guard, a whirl positioned within the guard, a spindle extending through one of the heads, and having connection with the whirl, whereby movement of the whirl produces a relative movement of the spindle.

3. In a device of the kind described, spaced heads, a substantially tubular guard having its ends connected to the heads, said guard having a cut out portion to permit access to the interior of the guard, ball bearing races supported within the guard, a whirl having its ends positioned in the ball bearing races, a spindle having connection with the whirl, whereby movement of the whirl produces relative movement of the spindle.

In testimony that I claim the foregoing as my own, I have hereto affixed my signature in the presence of two witnesses.

GEORGE HOWARD SHELDON.

Witnesses:
 FRANCES L. BURDICK,
 S. H. DAVIS.